United States Patent
Chiu et al.

(10) Patent No.: US 7,994,746 B2
(45) Date of Patent: Aug. 9, 2011

(54) MOTOR CONTROL METHOD AND APPARATUS THEREOF

(75) Inventors: Chin-Fa Chiu, Taoyuan Hsien (TW); Chun-Lung Chiu, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 645 days.

(21) Appl. No.: 12/110,935

(22) Filed: Apr. 28, 2008

(65) Prior Publication Data

US 2008/0292290 A1 Nov. 27, 2008

(30) Foreign Application Priority Data

May 25, 2007 (TW) .............................. 96118692 A (51) Int. Cl.
 *H02P 6/06* (2006.01)
(52) U.S. Cl. .............................. 318/400.05; 318/400.26
(58) Field of Classification Search .................. 318/599, 318/811, 400.05, 400.06, 400.26, 400.37, 318/400.38, 434
See application file for complete search history.

(56) References Cited

U.S. PATENT DOCUMENTS

| | | | | |
|---|---|---|---|---|
| 5,187,427 A | * | 2/1993 | Erdman | 323/207 |
| 5,526,252 A | * | 6/1996 | Erdman | 363/41 |
| 5,543,695 A | * | 8/1996 | Culp et al. | 318/432 |
| 6,188,189 B1 | * | 2/2001 | Blake | 318/471 |
| 6,307,336 B1 | * | 10/2001 | Goff et al. | 318/400.09 |
| 6,630,764 B1 | * | 10/2003 | Dube et al. | 310/177 |
| 6,801,009 B2 | * | 10/2004 | Makaran et al. | 318/599 |
| 7,075,267 B1 | * | 7/2006 | Cheng | 318/807 |
| 7,206,715 B2 | * | 4/2007 | Vanderveen et al. | 702/138 |

\* cited by examiner

*Primary Examiner* — Rina I Duda
(74) *Attorney, Agent, or Firm* — Muncy, Geissler, Olds & Lowe, PLLC (57) ABSTRACT

A motor controlling method and apparatus thereof are provided. The control method includes the steps of receiving a switching phase signal of coil while the motor is rotating, for generating a separate signal, comparing the phase signal and the separate signal to generate a first control signal, generating a current feedback signal equivalent to the first control signal, and comparing the current feedback signal and the separate signal for generating a second control signal so as to control the operation of the motor.

20 Claims, 10 Drawing Sheets

MOTOR CONTROL METHOD AND APPARATUS THEREOF

CROSS REFERENCE TO RELATED APPLICATIONS

This Non-provisional application claims priority under 35 U.S.C. §119(a) on patent application Ser. No. 096118692, filed in Taiwan, Republic of China on May 25, 2007, the entire contents of which are hereby incorporated by reference.

BACKGROUND OF THE INVENTION

1. Field of the Invention

The present invention relates to a motor control method and apparatus, and more particularly to a control method and apparatus capable of improving a motor speed control signal so as to reduce noise and increase the operating efficiency while the motor is operating.

2. Description of the Related Art

Today, motor control methods are sophisticated and advanced, utilizing circuits to control motor rotation. Furthermore, circuits are used to change or limit motor rotational speed, along with other functions of motor control.

Figure 1:
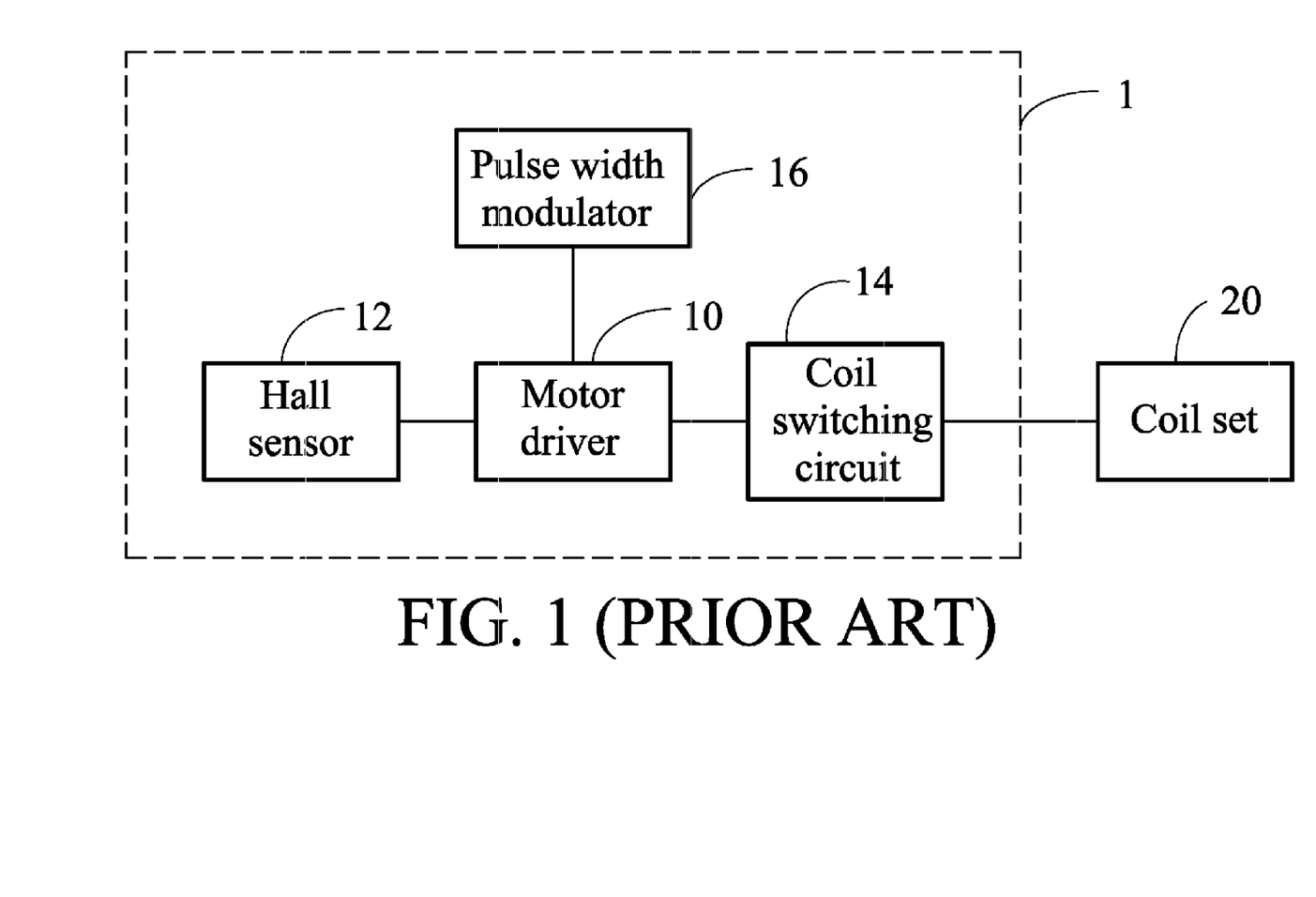
FIG. 1 is a block diagram of a conventional motor control apparatus.
Figure 2:
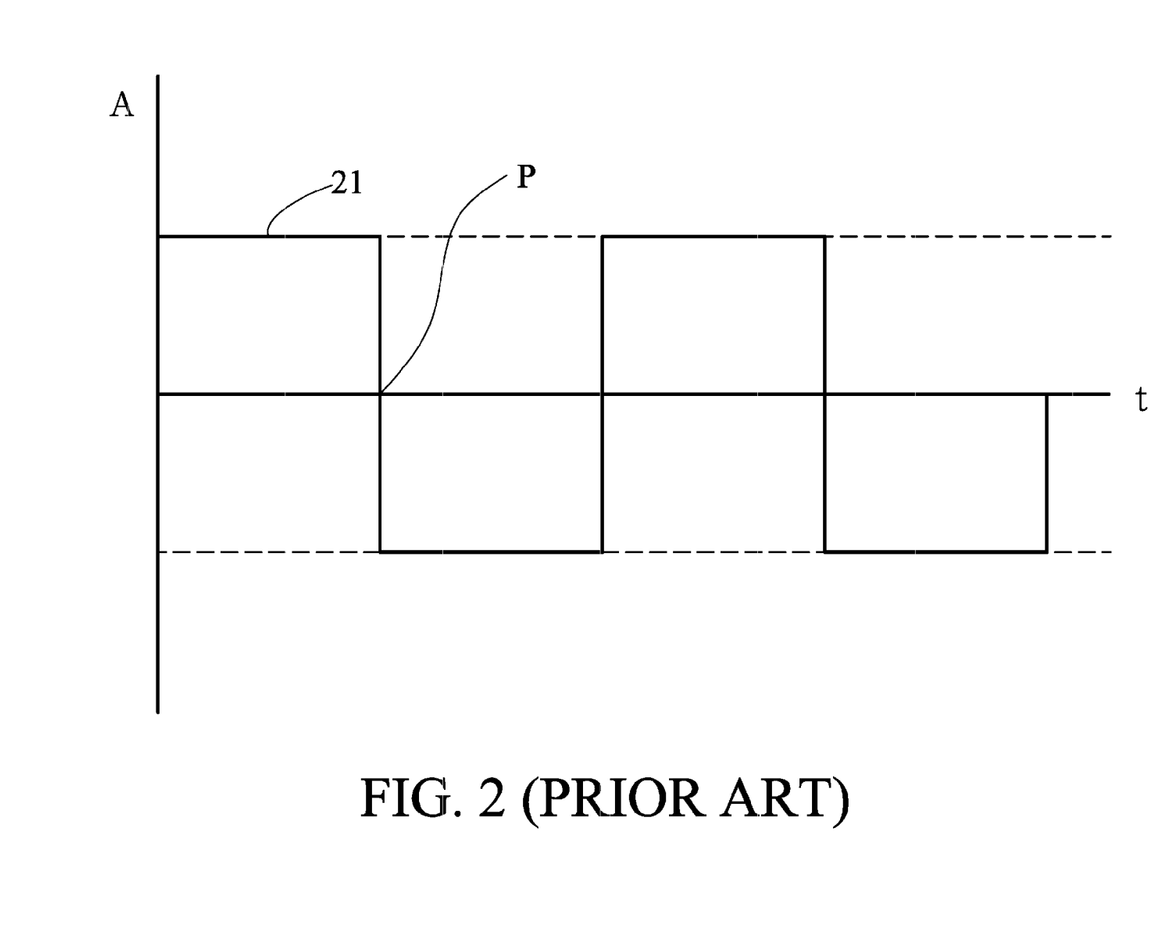
FIG. 2 shows a waveform of a conventional motor control signal.
Figure 3:
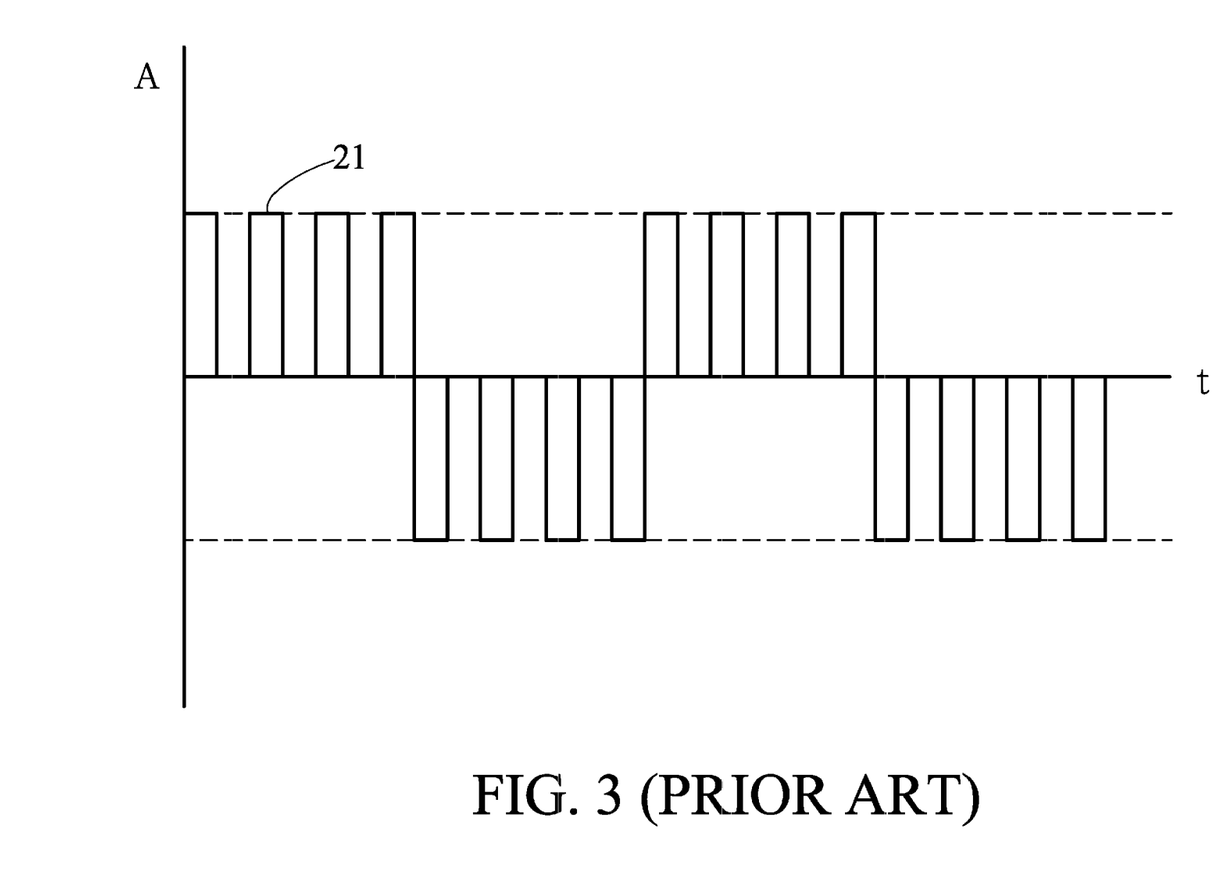
FIG. 3 shows a waveform of a conventional motor control signal with modulated pulse width modulation (PWM)

A well-known motor control apparatus is shown in FIG. 1. The motor control apparatus 1 includes the motor driver 10, the hall sensor 12, the coil switching circuit 14, and the pulse width modulator 16. The hall sensor 12 detects a phase signal generated while the motor is operating, and the phase signal is equal to the phase switched by coil set 20 of the motor. The motor driver 10 is electrically coupled to the hall sensor 12, receives the phase signal from hall sensor 12 to generate a motor speed control signal. The motor speed control signal usually consists of regular and continuous rectangular waves. FIG. 2 shows the waveform of the motor speed control signal 21. Ordinate A designates the amplitude of waveform, which can be represented as a voltage, while abscissa t designates time. The motor driver 10 is usually an application specific integrated circuit (ASIC), which is well known by those skilled in the art and easily acquired as an industrial product. Meanwhile, the coil switching circuit 14 often consists of two MOS switches. When the motor control signal 21 generated by the motor driver 10 is input into the coil switching circuit 14, the coil switching circuit 14 will output a motor speed control signal 21 sequentially into the coil set 20 of the motor so as to switch the current flow of two adjacent phases to sustain motor operation. Moreover, a pulse width modulator 16 can modulate motor speed control signal 21 as uniform-distributed rectangular waves by way of pulse width modulation (PWM). Referring to FIG. 3, after the motor speed control signal 21 is divided into several small rectangular waves, the motor control signal 21 is equalized to smaller amplitude according to the equivalent principle. Inputting the equivalent motor control signal 21 into the coil set 20 will slow down the rotational speed of the motor. However, when the coil set 20 is under the switching phases (for example, point P in FIG. 2), the current flow passing through the coil will be instantly switched to the opposite direction, and thus result in large noises during motor operation. Especially for a fan motor, large noises limit the application of the fan motor.

BRIEF SUMMARY OF THE INVENTION

The present invention provides a motor control method and apparatus for generating a new motor speed control signal to control the rotational speed of the motor, thereby reducing noise and increasing efficiency while a coil set of the motor is switching phases.

The present invention provides a motor control method. First, a phase signal with a phase identical to a switching phase signal of a coil set is received while a motor is operating. Next, a separate signal is generated. Next, the phase signal is compared with the separate signal to generate a first control signal. Next, a current feedback signal equivalent to the first control signal is received. Finally, the current feedback signal is compared with the separate signal for generating a second control signal to control the operation of the motor.

The present invention also provides a motor control apparatus including a phase sampling circuit, a separate signal generating circuit, a first comparison circuit, a motor driver, a coil switching circuit, a current sampling circuit, and a second comparison circuit. The phase sampling circuit detects a phase switching signal generated while a motor is operating, and outputs a corresponding phase signal. The separate signal generating circuit generates a separate signal and outputs the separate signal. The first comparison circuit is electrically coupled to the phase sampling circuit and the separate signal generating circuit, compares the phase signal with the separate signal to generate a first control signal, and outputs the first control signal. The motor driver is electrically coupled to the phase sampling circuit and the first comparison circuit, receives the first control signal from the first comparison circuit to process the first control signal, and outputs the processed first control signal. The coil switching circuit is electrically coupled to the motor driver, receives the processed first control signal from the motor driver, and switches the phases of the motor according to the processed first control signal. The current sampling circuit is electrically coupled to the coil switching circuit, receives a current feedback signal equivalent to the first control signal from the coil switching circuit, and outputs the current feedback signal. The second comparison circuit is electrically coupled to the current sampling circuit, the separate signal generating circuit, and the motor driver, compares the current feedback signal with the separate signal to generate a second control signal, and outputs the second control signal to the motor driver, thereby driving the coil switching circuit to control the operation of the motor.

The present invention also provides a motor control apparatus including a phase sampling circuit, a coil switching circuit, and a programmable integrated circuit. The phase sampling circuit detects a phase switching signal generated while a motor is operating, and outputs a corresponding phase signal. The programmable integrated circuit is electrically coupled to the phase sampling circuit and the coil switching circuit, receives the phase signal, generates a separate signal, compares the phase signal with the separate signal to generate a first control signal to output to the coil switching circuit, receives a current feedback signal equivalent to the first control signal from the coil switching circuit, and compares the current feedback signal with the separate signal to generate a second control signal to output to the coil switching circuit, thereby controlling the operation of the motor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 4:
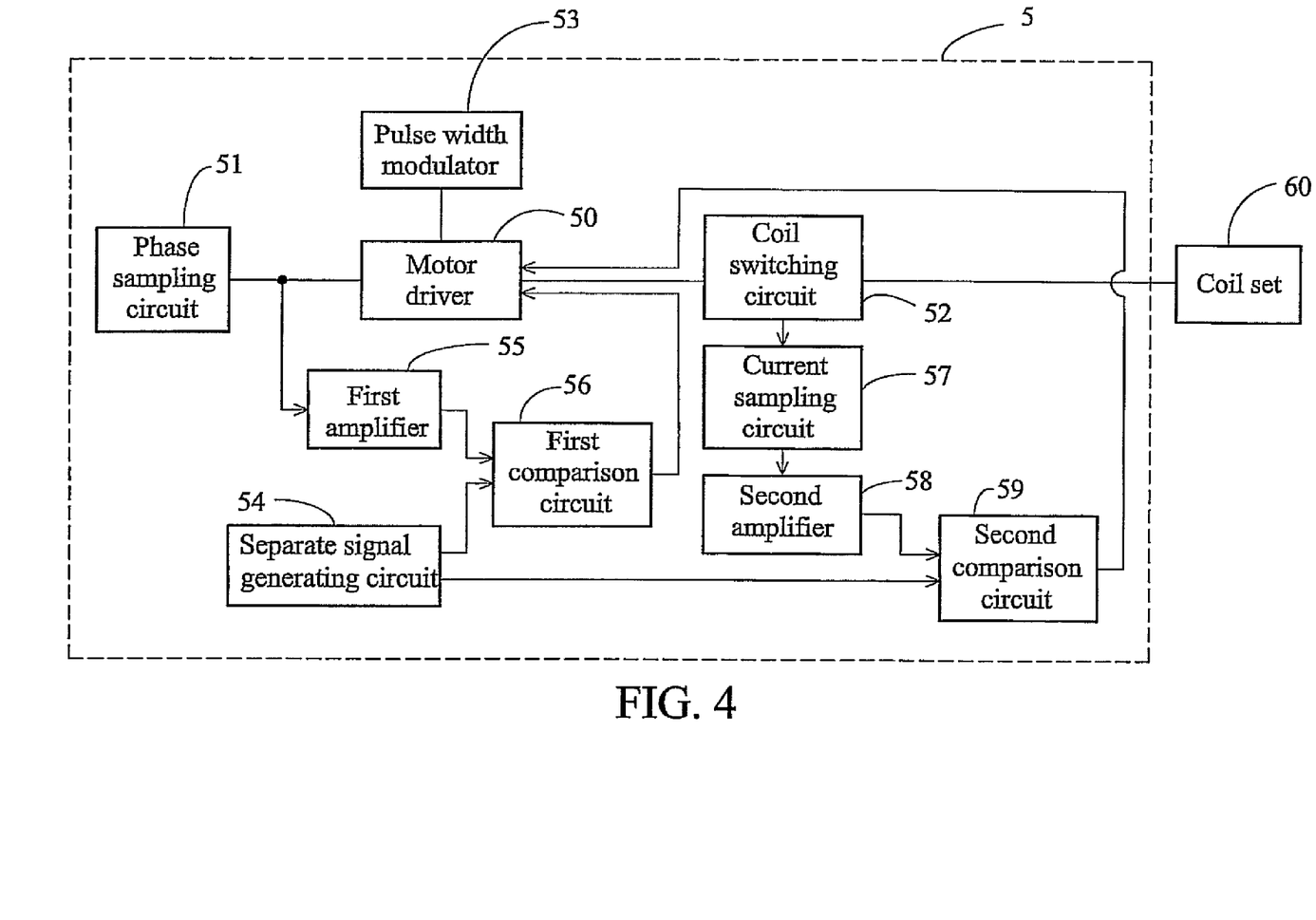
FIG. 4 is a block diagram of a motor control apparatus according to an embodiment of the present invention.

FIG. 4 is a preferred embodiment according to the present invention, the motor control apparatus 5 includes a motor driver 50, a phase sampling circuit 51 (such as a hall sensor), a coil switching circuit 52, a pulse width modulator 53, a separate signal generating circuit 54, a first amplifier 55, a first comparison circuit 56, a current sampling circuit 57, a second amplifier 58, and a second comparison circuit 59. The motor driver 50, the phase sampling circuit 51 (such as Hall sensor), the pulse width modulator 53, and the coil switching circuit 54 are well known in the art and not described in detail hereafter for brevity.

The separate signal generating circuit 54 generates a separate signal. The first amplifier 55 is electrically coupled to the phase sampling circuit 51 and the first comparison circuit 56, respectively, and the first amplifier 55 receives a phase signal generated from the phase sampling circuit 51 to processes the phase signal and outputs it to an input port of the first comparison circuit 56. Two input ports of the first comparison circuit 56 are respectively coupled to the first amplifier 55 and the separate signal generating circuit 54. After the phase signal is compared with the separate signal, the output port of the first comparison circuit 56 generates the first control signal and outputs it to the motor driver 50. After the first control signal is processed by the motor driver 50, the processed first control signal is output to the coil switching circuit 52. The current sampling circuit 57 is electrically coupled to the coil switching circuit 52 and the second amplifier 58, and the current sampling circuit 57 receives a current feedback signal equivalent to the first control signal from the coil switching circuit 52, and then outputs the current feedback signal to the second amplifier 58. The second amplifier 58 is electrically coupled to the current sampling circuit 57 and the second comparison circuit 59, and the second amplifier 58 receives the current feedback signal from the current sampling circuit 57 to amplify it, and then outputs it to the second comparison circuit 59. The second comparison circuit 59 is electrically coupled to the second amplifier 58 and the separate signal generating circuit 54, and the second comparison circuit 59 compares the current feedback signal with the separate signal to generate a second control signal to output to the motor driver 50. The motor driver 50 processes the second control signal so as to output the second control signal to the coil switching circuit 52. The coil switching circuit 52 outputs the second control signal and switches the phases of coil set 60 to maintain the motor to rotate or operate.

The motor driver 50 can also receive a PWM signal from the pulse width modulator 53 to modulate the motor control signals to change the rotational speed of the motor.

Figure 5:
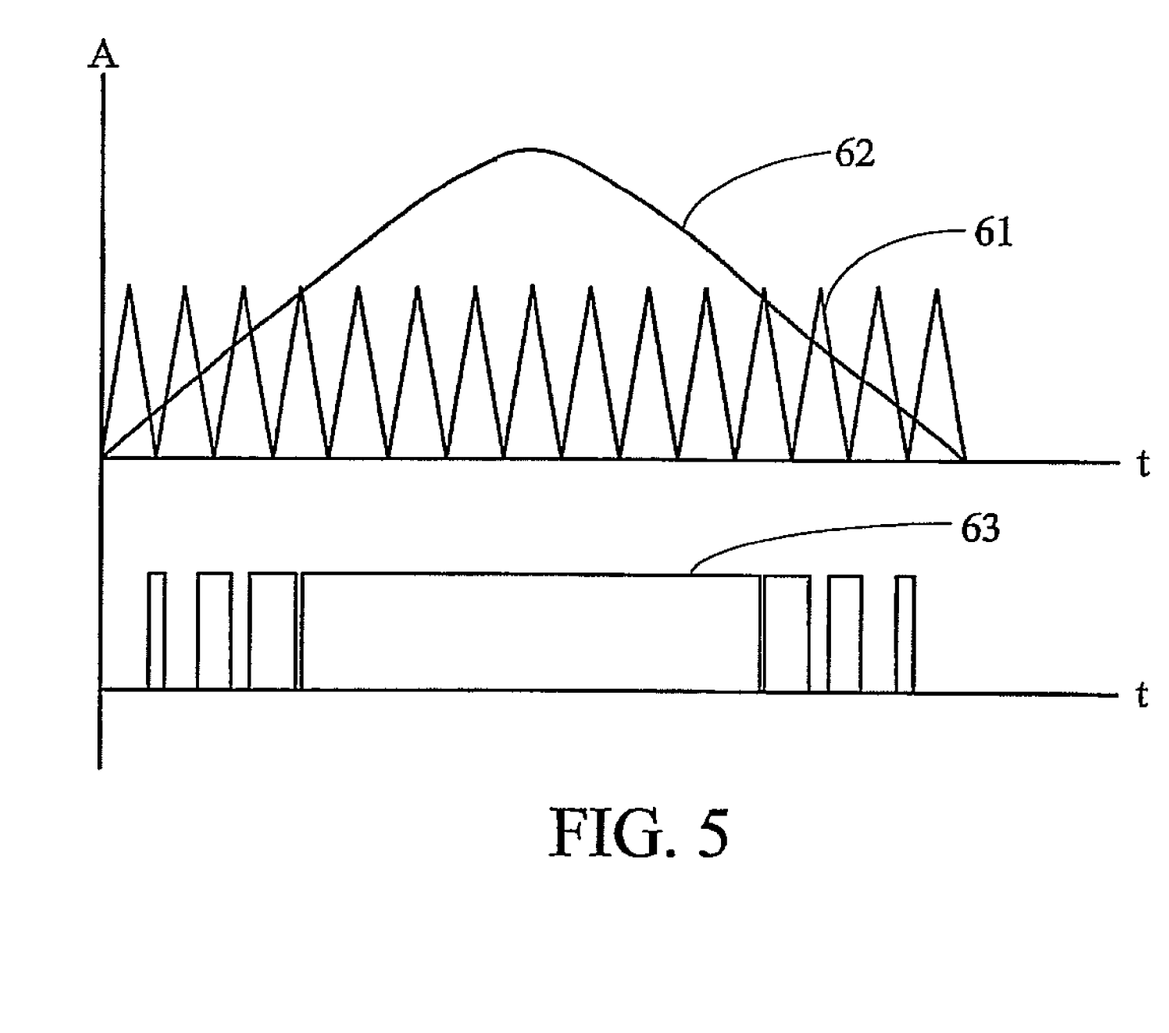
FIG. 5 shows a waveform of the first control signal according to an embodiment of the present invention.

FIG. 5 shows the waveforms within a predetermined phase range. Ordinate A designates the amplitude of the waveforms, which can be represented as voltage (it can also be represented as current or power in other embodiments due to the proportional relationship between voltage, current, and power), and abscissa t designates time. In FIG. 5 the separate signal 61 generated from the separate signal generating circuit 54 consists of continuous and regular-distributed triangular waves. The separate signal 61, however, is not limited to be triangular waves, and can also consist of regular-distributed trapezoid, sine, or polygonal waves, or other waveforms depending on designer's requirements. In addition, the phase of phase signal 62 is identical to the phase switched by the coil set 60 when the first amplifier 55 amplifies the phase signal 62 generated from the phase sampling circuit 51 and outputs it. In addition, the first control signal 63, i.e. the first motor speed control signal, can be generated after the phase signal 62 is compared with the separate signal 61 by the first comparison circuit 56. When the phase signal 62 is higher than the separate signal 61, the first comparison circuit 56 outputs a high level signal; otherwise, the comparison circuit 56 outputs a low level signal, and therefore the first control signal 63 is generated. The first control signal 63 consists of rectangular waves. Within a predetermined phase range, the width of the rectangular waves close to the center of the predetermined phase range is wider than the width of the rectangular waves far from the center of the predetermined phase range.

Figure 6:
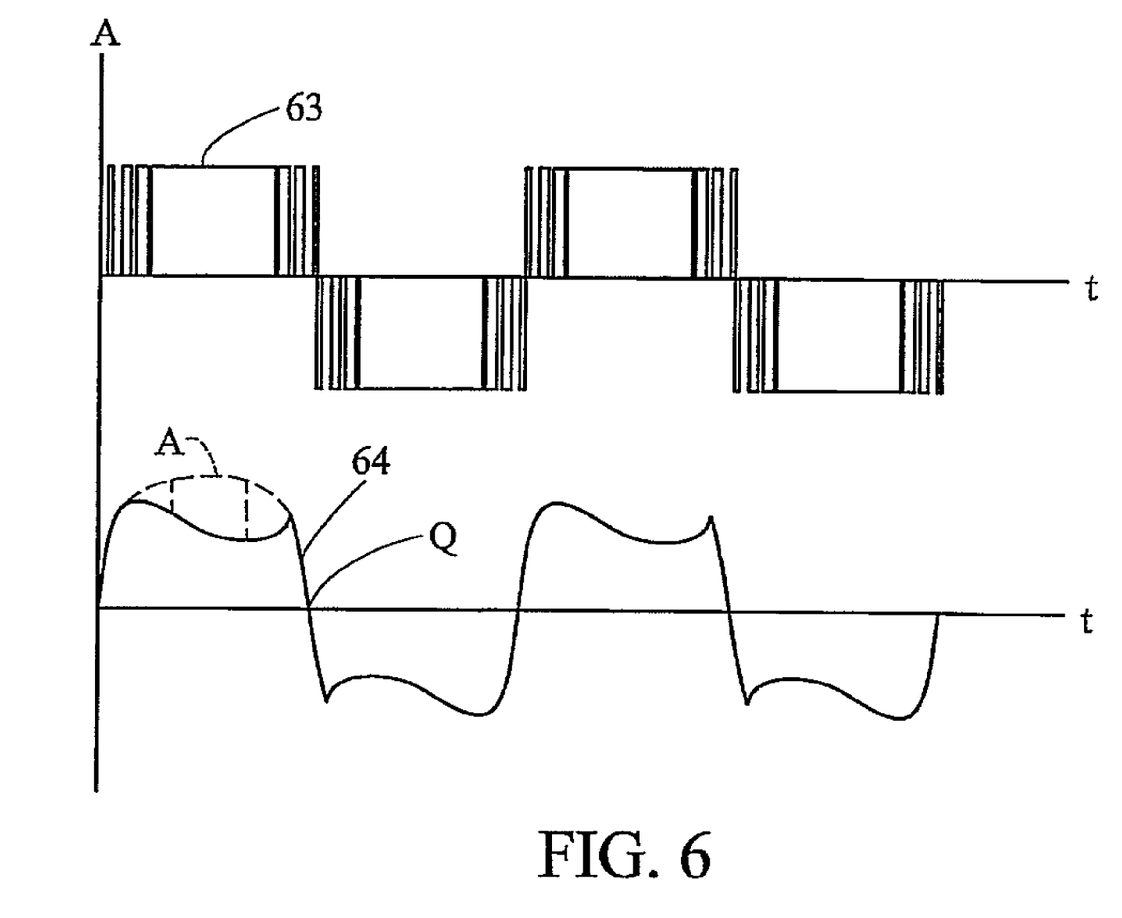
FIG. 6 shows a current waveform equivalent to the first control signal according to an embodiment of the present invention.

Referring to FIG. 6, the first control signal 63 input to the coil switching circuit 52 can be equivalent to the current feedback signal 64. The amplitude of the current feedback signal 64 is smoothly reversed while the phase of the coil set 60 is switched (for example, point Q in FIG. 6), and the current flow of the coil set 60 is also smoothly switched. In this embodiment, the coil set 60 rotates according to the switched current flow more fluently than the conventional motor control apparatus, thereby reducing noise greatly. In FIG. 6, however, the lower amplitude of the current feedback signal 64 (i.e. the concave region A) is slightly different from an ideal sine wave.

Figure 7:
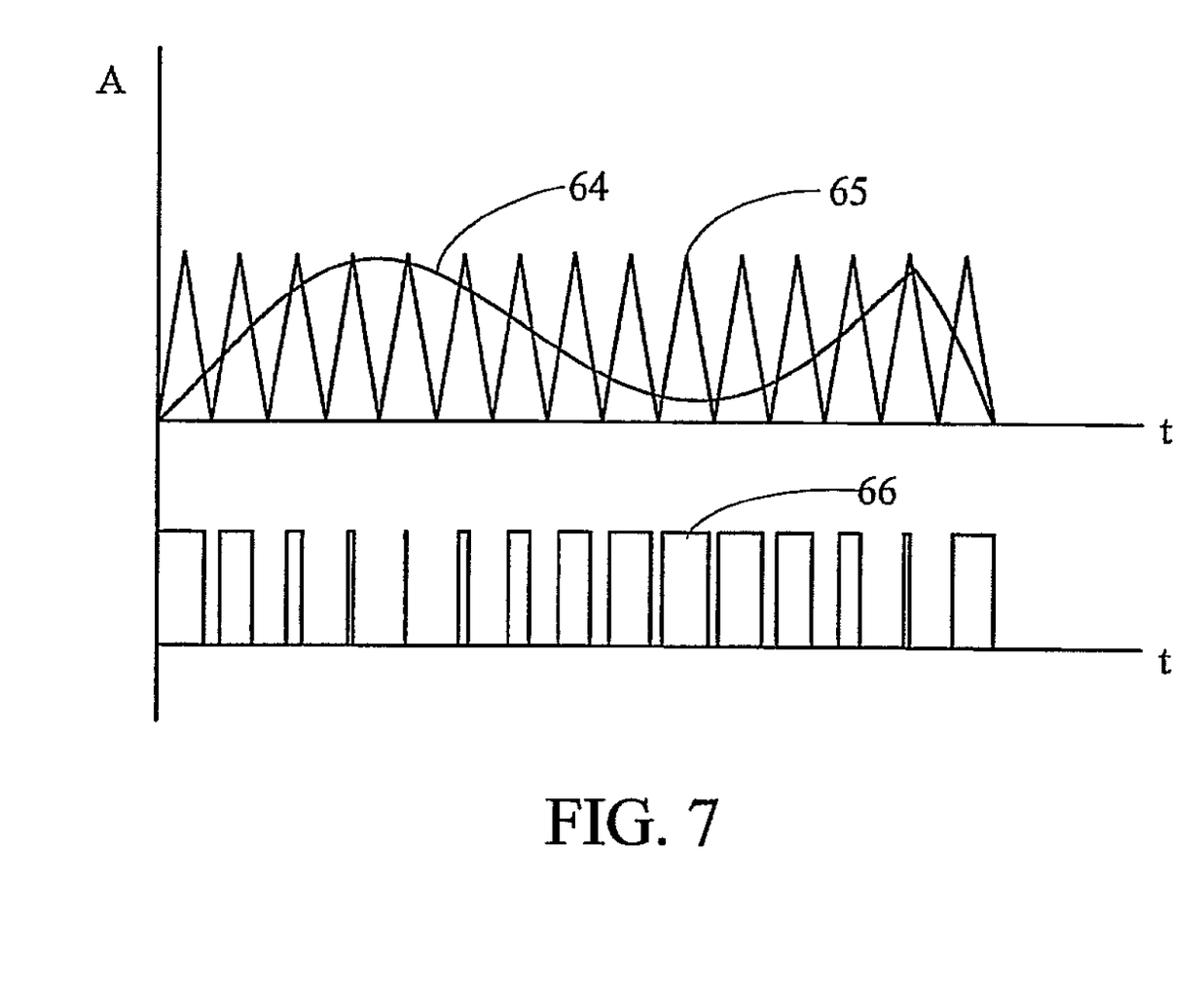
FIG. 7 shows a waveform of the second control signal according to an embodiment of the present invention.
Figure 8:
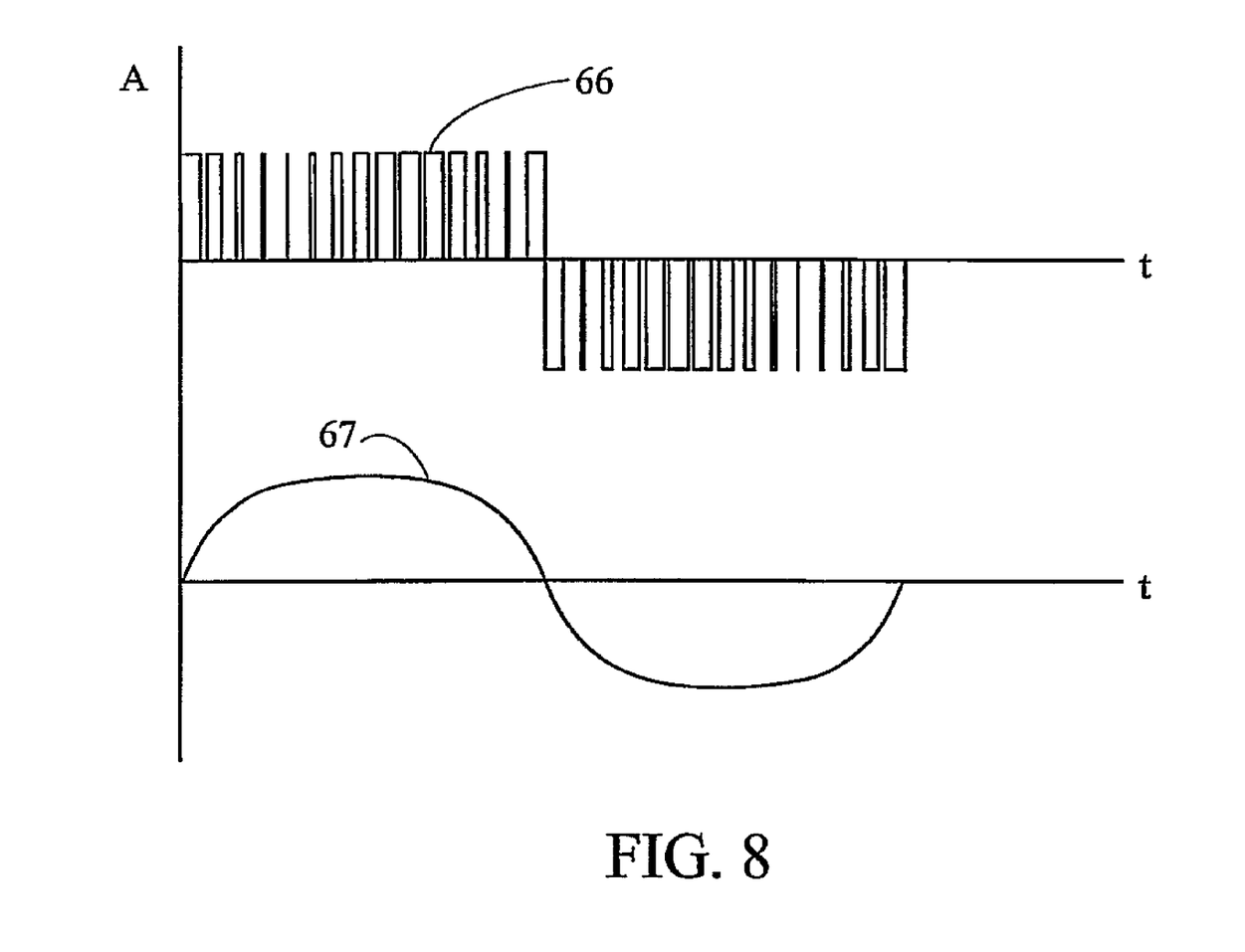
FIG. 8 shows a waveform equivalent to the second control signal according to an embodiment of the present invention.

To solve this issue, the current sampling circuit 57 is utilized to receive the current feedback signal 64 from the coil switching circuit 52. The second amplifier 58 amplifies the current feedback signal 64 and then outputs it. Referring to FIG. 7, the current feedback signal 64 output from the second amplifier 58 is compared with the separate signal 65 by the second comparison circuit 59 to generate the second control signal 66, i.e. the second motor speed control signal. The operation of the second comparison circuit 59 is contrary to the operation of the first comparison circuit 56. When the separate signal 65 is higher than the current feedback signal 64, the second comparison circuit 59 outputs a high level signal; when the separate signal 65 is lower than the current feedback signal 64, the second comparison circuit 59 outputs a low level signal, and thus the second control signal 66 is generated accordingly. The second control signal 66 consists of rectangular waves. Within a predetermined phase range, the width of the rectangular waves corresponding to the lower amplitude of the current feedback signal 64 (i.e. concave region A) is wider than the width of the rectangular waves corresponding to the higher amplitude of the current feedback signal 64. Referring to FIG. 8, the coil switching circuit 52 outputs an equivalent current feedback signal 67 while the second control signal 66 is passing through the coil switching circuit 52. It is noted that the current feedback signal 67 is close to the ideal sine wave in comparison with the current feedback signal 64, thereby increasing the efficiency of the motor. Moreover, since motor control apparatus 5 continuously transfers the motor speed control signals to the coil set 60, the current feedback signal 67 will be modulated with the separate signal 65 again to generate a new control signal (i.e. new motor speed control signal). By continuously modulating the current feedback signal to generate a new control signal, it will continuously optimize the efficiency of the motor.

Figure 9:
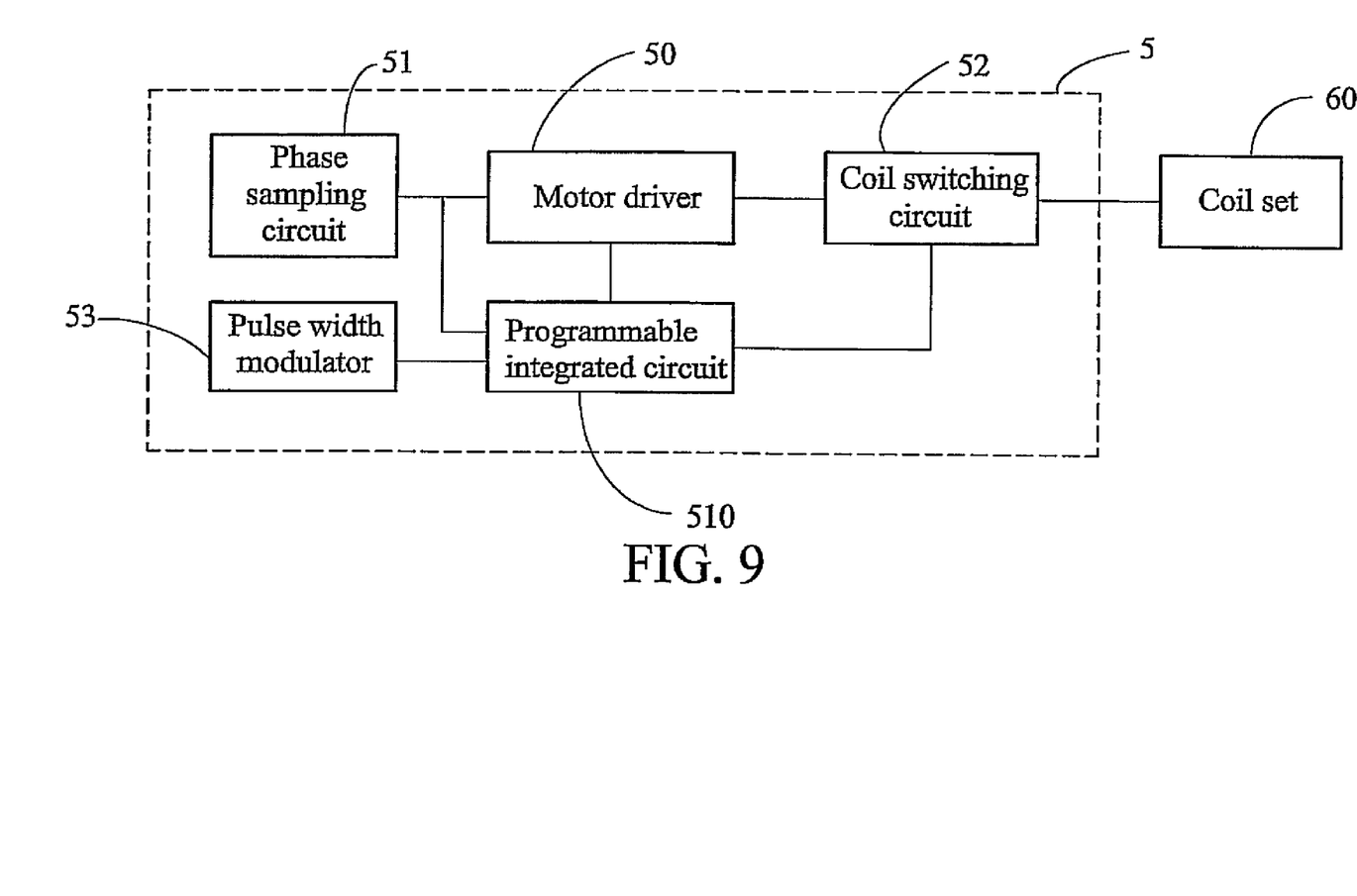
FIG. 9 is another block diagram according to an embodiment of the present invention.

FIG. 9 is a second preferred embodiment of the motor control apparatus 5 according to the present invention. The motor control apparatus 5 includes the phase sampling circuit 51 (such as hall sensor), the coil switching circuit 52, the programmable integrated circuit 510, the motor driver 50, and the pulse width modulator 53. The functionality of the separate signal generating circuit 54, the first amplifier 55, the first comparison circuit 56, the current sampling circuit 58, the second amplifier 57, and the second comparison circuit 59 in the first embodiment can be realized in the programmable integrated circuit 510. The programmable integrated circuit 510 is electrically coupled to the phase sampling circuit 51 and the coil switching circuit 52, can store a program and load it for further execution. The programmable integrated circuit 510 receives the phase signal 62 from the phase sampling circuit 51, compares the phase signal 62 with the separate signal 61 generated by the programmable integrated circuit 510 to generate the first control signal 63. The First control signal 63 is output to the motor driver 50 and the coil switching circuit 52. Next, the programmable integrated circuit 510 receives a current feedback signal 64 equivalent to the first control signal 63 from the coil switching circuit 52. The current feedback signal 64 is compared with the separate signal 65 to generate the second control signal 66. The second control signal 66 is output to the motor driver 50 and the coil switching circuit 52 to control the operation or rotation of the motor.

By utilizing the programmable integrated circuit 510, the second control signal 66 can be provided to the coil set 60, thereby not only reducing noise and increasing the efficiency of the motor while the coil set 60 is switching phases, but also simplifying the circuit structure.

Figure 10:
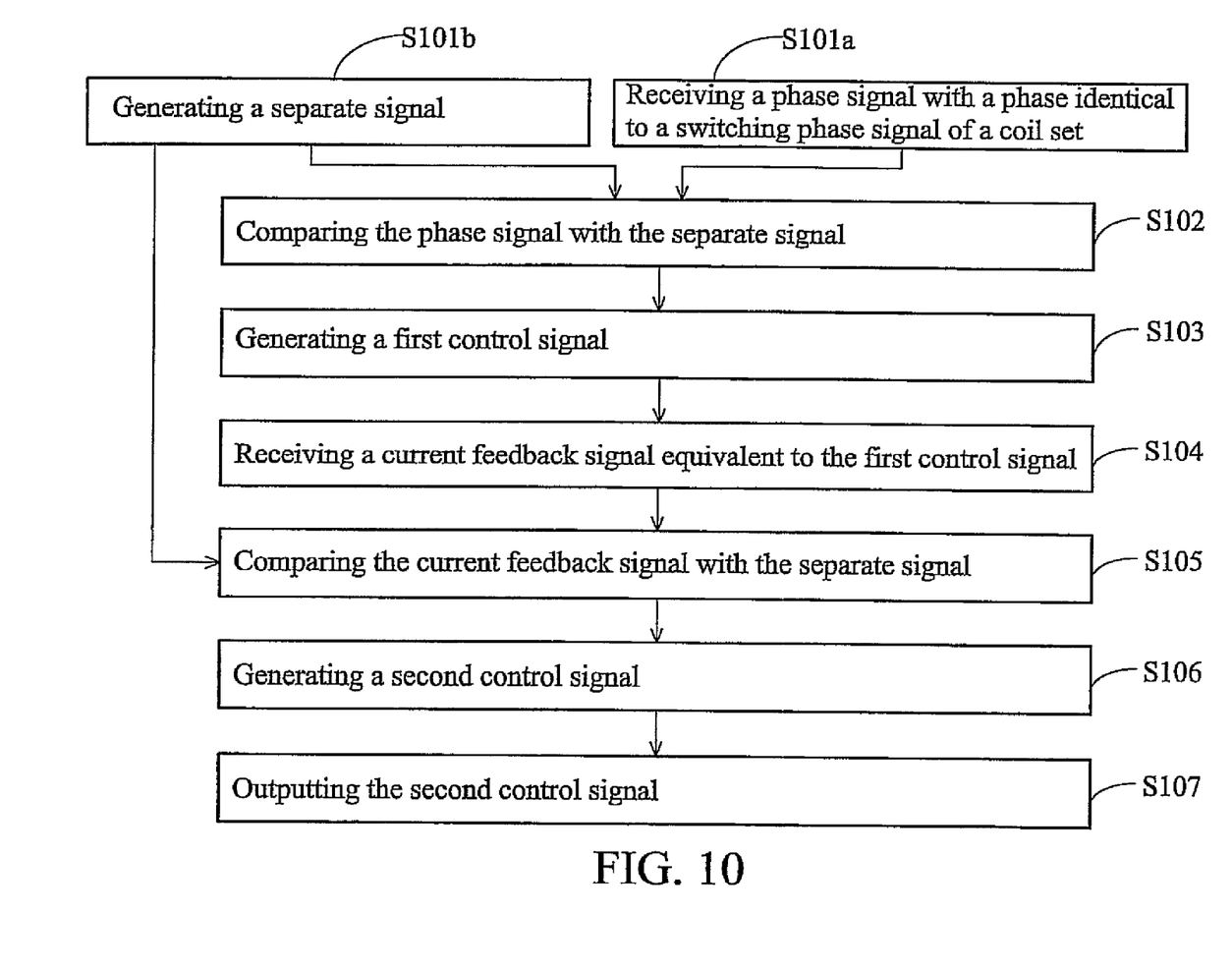
FIG. 10 shows a motor control method according to an embodiment of the present invention.

FIG. 10 shows a motor control method of an embodiment according to the present invention. The method mainly improves a motor control signal to increase the efficiency of the motor, of which steps are described in detail as follows.

Firstly, the phase signal 62 with a phase identical to a switching phase signal of a coil set while a motor is operating is received, and the phase signal 62 can be detected by the phase sampling circuit 51 (step S101a).

The separate signal 61 is received from the separate signal generating circuit 51. The separate signal 61 includes continuous and uniform-distributed signals, such as triangular, sine, trapezoid, or polygonal wave (step S101b).

The phase signal 62 is compared with the separate signal 61 to generate the first control signal 63, which is also referred as to the first motor speed control signal (step S102 and S103).

The current feedback signal 64 equivalent to the first control signal 63 is received. The current feedback signal 64 is received by the current sampling circuit 57 by detecting an equivalent current signal output by the coil switching circuit 52 while the first control signal 63 is input to the coil switching circuit 52 (step S104).

The current feedback signal 64 is compared with the separate signal 65 by the second comparison circuit 59 to generate the second control signal 66, which is also referred as to the second motor speed control signal (step S105 and S106).

The second control signal 66 is output to the motor driver 50, and the motor driver 50 drives the coil switching circuit 52 according to the second control signal 66 to control the coil set 60 for the operation of the motor (step S107).

The motor control method provides the second motor speed control signal to the coil set 60, thereby greatly reducing noise and increasing the operational efficiency of the motor while the coil set 60 is switching phases.

While the present invention has been described by way of examples and in terms of preferred embodiments, it is to be understood that the present invention is not limited thereto. Any variation or modification can be made by those skilled in art without departing from the spirit or scope of the present invention. Therefore, the scope of the appended claims should be accorded the broadest interpretation to encompass all such modifications and similar arrangements.

What is claimed is:

1. A motor control method, comprising steps of:
   receiving a phase signal with a phase identical to a switching phase signal of a coil set while a motor is operating;
   generating a separate signal;
   comparing the phase signal with the separate signal to generate a first control signal;
   receiving a current feedback signal equivalent to the first control signal; and
   comparing the current feedback signal with the separate signal for generating a second control signal to control the operation of the motor.

2. The motor control method of claim 1, wherein the phase signal is generated by a phase sampling circuit by detecting the phase switched by the coil set during the rotation of the motor.

3. The motor control method of claim 1, wherein the separate signal is received from a separate signal generating circuit.

4. The motor control method of claim 1, wherein the separate signal comprises a plurality of continuous and uniform-distributing signals, and the separate signal is a triangular, sine, trapezoid, or polygonal wave.

5. The motor control method of claim 1, wherein the current feedback signal is received by a current sampling circuit, by detecting a current signal on a coil switching circuit when the first control signal is input to the coil switching circuit.

6. The motor control method of claim 1, wherein the first control signal within a predetermined phase range comprises a plurality of rectangular waves, the width of the rectangular waves closer to the center of the predetermined phase range is wider than the width of the rectangular waves far from the center of the predetermined phase range.

7. The motor control method of claim 1, wherein the second control signal within a predetermined phase range comprises a plurality of rectangular waves, the width of the rectangular waves corresponding to lower amplitude of the current feedback signal is wider than the width of the rectangular waves corresponding to higher amplitude of the current feedback signal.

8. A motor control apparatus, comprising:
   a phase sampling circuit, provided to detect a phase switching signal generated while a motor is rotating, and output a corresponding phase signal;
   a separate signal generating circuit, provided to generate a separate signal and output the separate signal;

a first comparison circuit, electrically coupled to the phase sampling circuit and the separate signal generating circuit, provided to compare the phase signal with the separate signal to generate a first control signal and output the first control signal;

a motor driver, electrically coupled to the phase sampling circuit and the first comparison circuit, and the motor driver provided to receive the first control signal from the first comparison circuit to process the first control signal, and output the processed first control signal;

a coil switching circuit, electrically coupled to the motor driver, the coil switching circuit provided to receive the processed first control signal from the motor driver, and switch the phase of the motor according to the processed first control signal;

a current sampling circuit, electrically coupled to the coil switching circuit, the current sampling circuit provided to receive a current feedback signal equivalent to the first control signal from the coil switching circuit and output the current feedback signal; and a second comparison circuit, electrically coupled to the current sampling circuit, the separate signal generating circuit, and the motor driver, the second comparison circuit provided to compare the current feedback signal with the separate signal to generate a second control signal, and output the second control signal to the motor driver, thereby driving the coil switching circuit to control the operation of the motor.

9. The motor control apparatus of claim 8, wherein the first comparison circuit outputs a high level signal when the phase signal is higher than the separate signal, and the first comparison circuit outputs a low level signal when the phase signal is lower than the separate signal.

10. The motor control apparatus of claim 8, wherein the second comparison circuit outputs a high level signal when the separate signal is higher than the current feedback signal, and the second comparison circuit outputs a low level signal when the separate signal is lower than the current feedback signal.

11. The motor control apparatus of claim 8, further comprising a first amplifier electrically coupled to the phase sampling circuit and the first comparison circuit, wherein the first amplifier is provided to receive and amplify the phase signal to output to the first comparison circuit.

12. The motor control apparatus of claim 8, further comprising a second amplifier electrically coupled to the phase sampling circuit and the second comparison circuit, wherein the second amplifier is provided to receive and amplify the current feedback signal output by the current sampling circuit to output to the second comparison circuit.

13. The motor control apparatus of claim 8, further comprising a pulse width modulator electrically coupled to the motor driver, wherein the pulse width modulator is provided to modulate the first control signal and second control signal received by the motor driver to change a rotational speed of the motor.

14. A motor control apparatus, comprising:
a phase sampling circuit, provided to detect a phase switching signal generated while a motor is rotating, and output a corresponding phase signal;
a coil switching circuit; and
a programmable integrated circuit, electrically coupled to the phase sampling circuit and the coil switching circuit, the programmable integrated circuit provided to receive the phase signal, generate a separate signal, compare the phase signal with the separate signal to generate a first control signal to output to the coil switching circuit, receive a current feedback signal equivalent to the first control signal from the coil switching circuit, and compare the current feedback signal with the separate signal to generate a second control signal to output to the coil switching circuit, thereby controlling the operation of the motor.

15. The motor control apparatus of claim 14, wherein the phase sampling circuit is a Hall sensor.

16. The motor control apparatus of claim 14, wherein the separate signal comprises a plurality of continuous and uniform-distributed signals, and the separate signal is a triangular, sine, trapezoid, or polygonal wave.

17. The motor control apparatus of claim 14, wherein the first control signal within a predetermined phase range comprises of a plurality of rectangular waves, and the width of the rectangular waves close to the center of the predetermined phase range is wider than the width of the rectangular waves far from the center of the predetermined phase range.

18. The motor control apparatus of claim 14, wherein the second control signal within a predetermined phase range comprises of a plurality of rectangular waves, and the width of the rectangular waves corresponding to lower amplitude of the current feedback signal is wider than the width of the rectangular waves corresponding to higher amplitude of the current feedback signal.

19. The motor control apparatus of claim 14, further comprising a motor driver, electrically coupled to the programmable integrated circuit and the coil switching circuit, wherein the motor driver is provided to receive the first and second control signals output by the programmable integrated circuit and drive the coil switching circuit to control the rotation of the motor via the first and second control signal.

20. The motor control apparatus of claim 14, further comprising a pulse width modulator electrically coupled to the programmable integrated circuit, wherein the pulse width modulator is provided to modulate the first control signal and second control signal to change a rotational speed of the motor.

* * * * *